United States Patent [19]

Du

[11] Patent Number: 5,600,795
[45] Date of Patent: Feb. 4, 1997

[54] LOCAL NETWORK OPERATING IN ASYNCHRONOUS TRANSFER MODE (ATM) GENERATING CONTROL CELL CONTAINING INFORMATION ABOUT THE USER, ADDRESS OF THE STATION, AND USER-RELATED IDENTIFICATION

[75] Inventor: Yonggang Du, Aachen, Germany

[73] Assignee: U.S. Philips Corporation, New York, N.Y.

[21] Appl. No.: 297,210

[22] Filed: Aug. 29, 1994

[51] Int. Cl.$^6$ ............................ G06F 13/00; G06F 13/14
[52] U.S. Cl. ............................ 395/200.02; 395/200.04; 395/200.1; 395/200.2; 395/413; 370/397; 370/410; 370/432
[58] Field of Search ........................ 370/56, 60, 60.1, 370/110.1, 93; 371/37.1; 395/200.02, 200.04, 200.1, 200.2, 413

[56] References Cited

U.S. PATENT DOCUMENTS

| | | | |
|---|---|---|---|
| 5,136,584 | 8/1992 | Hedlund | 370/34.1 |
| 5,164,937 | 11/1992 | Tanabe et al. | 370/56 |
| 5,305,311 | 4/1994 | Lyles | 370/60 |
| 5,315,586 | 5/1994 | Charvillat | 370/60 |
| 5,323,389 | 6/1994 | Bitz et al. | 370/60.1 |
| 5,339,318 | 8/1994 | Tanaka et al. | 370/110.1 |
| 5,365,551 | 11/1994 | Snodgrass et al. | 375/1 |
| 5,369,649 | 11/1994 | Murayama et al. | 371/37.1 |

OTHER PUBLICATIONS

"Ohne Chips Nichts Los" Standard Chips Fur ATM–Systeme Sind Im Kommen, Bernd Reder, Elecktronic Jan. 1993 pp. 66–75.

*Primary Examiner*—Thomas C. Lee
*Assistant Examiner*—Po C. Huang
*Attorney, Agent, or Firm*—Michael E. Marion

[57] ABSTRACT

The invention relates to a local network operating in the asynchronous transfer mode (ATM), comprising a plurality of stations which are coupled, via network interfaces comprising a coupling device and a control arrangement, to sending and receiving ring lines and which are provided for transmitting user cells containing user-oriented information and at least control cells containing signalling information. The control arrangement assigned to a transmitter station is provided for generating at least a control cell to be sent to a receiver station after the control arrangement has received from the transmitter station a control cell with a realisable request for a unicast or multicast connection from a user of the transmitter station to a user of at least one receiver station, which control cell has in its information field at least information about the users, the address of the transmitter station and a user-related identification for a down channel. At least one control arrangement assigned to a receiver station is provided for generating a control cell to be transmitted to the transmitter station after a transmitter station-originated control cell containing a realisable connection request from a user of the receiver station has been received, which control cell contains in its information field at least an indication about the address of the assigned receiver station and a user-related identification for the up-channel.

16 Claims, 2 Drawing Sheets

LOCAL NETWORK OPERATING IN ASYNCHRONOUS TRANSFER MODE (ATM) GENERATING CONTROL CELL CONTAINING INFORMATION ABOUT THE USER, ADDRESS OF THE STATION, AND USER-RELATED IDENTIFICATION

BACKGROUND OF THE INVENTION

1. Field of the Invention

The invention relates to a local network operating in the asynchronous transfer mode (ATM), comprising a plurality of stations which are coupled, via network interfaces comprising a coupling device and a control arrangement, to sending and receiving ring lines and which stations are provided for transmitting user cells containing user-oriented information and at least control cells containing signalling information.

2. Discussion of the Related Art

A local network operating in the asynchronous transfer mode (ATM) is known from the publication "Ohne Chips nichts los"—Standard-Chips für ATM-Systeme sind im Kommen, by Bernd Reder, Elektronik January 1993, pp. 66 to 75. This paper discusses the current development of integrated circuits used in local networks, which networks operate in the asynchronous transfer mode (ATM). Each station is then connected to the ring lines of the local network via network interfaces. Coupling devices (switches) are used in the network interfaces to control the ATM cell stream.

When an asynchronous transfer mode is used in a system, payload, for example, telephone, video or sound signals, is sent in blocks of fixed length through arrangements for digital signal processing. By a block of fixed length is meant a cell which contains a given number of bytes (for example, 53 bytes). Each cell contains a header field having a length of, for example, 5 bytes, and an information field which accommodates the payload and has a length of, for example, 48 bytes. In such a header field are available routing identifications, error recognition data and control data. Routing identifications are meant to be understood as trunk identifiers and link identifiers. The link identifier, also referenced VCI (Virtual Channel Identifier), contains the description of the destination of the cell in the system. To transmit a cell, a virtual channel is made available in response to the virtual channel identifier. As a rule, a VCI is changed each time an exchange is reached. A trunk group of various virtual channels is referenced a virtual path. A virtual path is identified by the trunk identifier. Such a virtual path is called a virtual path identifier (VPI). Cells are assigned to consecutively determined periods of time. The length of such a period of time depends on the clock rate used as a basis of the transfer components. If no payload is available, empty cells i.e. cells without payload, are transmitted in such a period of time. Cells containing payload are referenced payload cells.

How a connection is set up and broken off (signalling) between two or more stations or network interfaces in the local network cannot be learnt from said paper.

SUMMARY OF THE INVENTION

Therefore, it is an object of the invention to provide a local network operating in the asynchronous transfer mode in which an intended connection is set up in a simple manner.

The object of the invention is achieved by a local network as defined in the opening paragraph operating in the asynchronous transfer mode, in that the control arrangement assigned to a transmitter station is provided for generating at least a control cell to be transmitted to a receiver station after a control cell containing a realisable request for a single (unicast) or a multiple (multicast) connection between a user of the transmitter station and a user of at least one receiver station has been received from the transmitter station, which control cell contains in its information field at least information about the user, the address of the transmitter station and a user-related identification for a down-channel, and in that at least a control arrangement assigned to a receiver station is provided for generating a control cell to be sent to the transmitter station after a control cell originating from the transmitter station and containing a realisable request for a connection from a user of the receiver station has been received which control cell contains in its information field at least a message about the address of the assigned receiver station and a user-related identification for the up-channel.

Each station and each network interface of the local network according to the invention produces control cells with which a connection is set up. On the one hand, control cells for the connection set-up are transmitted between a station and an assigned network interface and, on the other, such control cells are transmitted between two or a plurality of network interfaces.

If a connection is set up between a user of a first station and the user of a second station, there is a unicast connection. If a connection is set up between a first user and a plurality of further users, there is a multicast connection. A user is meant to be understood as, for example, a user of a program in a station, a program itself, stored data (station as a data bank), or simply telephone subscribers.

If a user of a transmitter station sends out a request for the connection with a user of a receiver station of the local network to the assigned network interface, first a test is made in the network interface whether such a connection is possible. If such a connection cannot be set up, a control cell is sent from the control arrangement of the network interface to the transmitter station, which cell contains information about the rejection of the request for the connection. In the other case, the control arrangement sends a control cell to the network interface of the receiver station with which the connection is to be set up. The information field of the control cell carries at least the information about the two users, the address of the assigned station and a user-related identification for the down-channel from the receiver station to the assigned station. If, at a later instant, cells containing the user-related identification in their header field are sent from a transmitter station to a receiver station, the coupling device recognizes from the identification and the address how the received cell is to be processed further.

If the control arrangement assigned to a receiver station receives a control cell containing a connection request from a user of a transmitter station from a control arrangement assigned to the transmitter station, the control arrangement assigned to the receiver station first checks whether such a connection is possible. If such a connection is impossible, the control arrangement assigned to the transmitter station is sent a control cell which contains a rejection of the connection request. In the other case a control cell is generated which is sent to the transmitter station and contains in the information field an address of the receiver station and a user-related identification for the up-channel from the transmitter to the receiver station. The user-related identification may be generated either in the transmitter station or in the receiver station.

If a multicast connection is set up, the control arrangement assigned to the transmitter station similarly transmits control cells to the control arrangements assigned to the receiver stations. The control arrangement of each network interface of the receiver stations acknowledges the successful connection set-up, or indicates that it is impossible to set up a connection.

In a unicast connection the control arrangement assigned to the transmitter station generates a user-related identification for the down-channel from the network interface of the receiver station to the network interface of the transmitter station. For the up-channel in a unicast connection the control arrangement assigned to the receiver circuit generates a user-related identification. The control arrangement assigned to a receiver station is provided for determining the user-related identification for the up-channel from the transmitter station to the receiver station after a control cell has been received containing a request for a connection between a user of the transmitter station and the receiver station in the case of a realisable unicast connection, and for generating a control cell to be transmitted to the transmitter station which cell carries at least the user-related identification.

In a multicast connection a user-related identification is sent to the control arrangements assigned to the receiver stations for the down-channels from the receiver stations to the transmitter station, as is similarly done for the unicast connection. For the up-channels from the transmitter station to the receiver stations, similarly to the unicast connection, a user-related identification can be transmitted from the control arrangement assigned to each receiver station to the control arrangement assigned to the transmitter station. However, it has turned out to be a faster method if the control arrangement assigned to the transmitter circuit also forms this identification and transmits same to the control arrangements assigned to the receiver stations.

This further embodiment of the invention is characterized by the following features:

The control arrangement assigned to a transmitter station, after a control cell carrying a request for a connection between a user of the transmitter station and at least one user of a plurality of receiver stations has been received in the case of a realisable multicast connection, is provided for determining the user-related identifications for the up and down-channels from the transmitter station to the receiver stations and provided for generating control cells to be transmitted to the receiver stations, which control cells contain at least the user-related identifications.

The control arrangement assigned to a receiver station is provided for storing the user-related identification and for generating a transmitter station-destined control cell which carries an acknowledgement of a connection after a control cell carrying a request for a connection between a user of the transmitter station and this receiver station and further receiver stations in the case of a realisable connection to the receiver station has been received.

If a multicast connection is set up, the control arrangement assigned to the transmitter station is provided for generating consecutively control cells for each receiver station.

The user-related identification for the up-channel may be formed, for example, by an individually issued number of the control arrangement assigned to the transmitter station and a unique number for the users of the transmitter station.

In a connection set up for a multicast connection, the control arrangement assigned to the transmitter station consecutively generates for each receiver station control cells which carry at least one user-related identification for the up-channel and one for the down-channel.

If a connection between a transmitter or receiver station is impossible, the control arrangement assigned to the station concerned generates the control cell carrying a message about the rejection of the request for a connection. This message can be transmitted, for example, from the control arrangement assigned to the transmitter station to the receiver station if, for example, the resources necessary for the connection are not available. Such a rejection may also be transmitted from a control arrangement assigned to a receiver station to a transmitter station if, for example, the desired user cannot be spoken to or if the station is switched off.

In an embodiment for a network interface, the coupling device of each network interface comprises receiving circuits, routing tables and a switching matrix. The receiving circuit is then used at least for taking the identification and the address from the header field of an arriving cell and for taking control information about the processing and further routing of the arrived cell based upon the identification and address from the routing table.

Using the identification and address of the routing table, information about the further processing and the further route of the cell is taken from this routing table. For example, from the table can be taken where the cell is to be conveyed to and whether the cell is to be copied for transport to a further station.

If a multicast connection is set up, the contents of the routing table are changed. When a control cell for a multicast connection has arrived, the control arrangement assigned to a receiver station is provided for taking an operating mode for the further routing of user cells, the identification and the address from the information field of the control cell, and for storing the operating mode at the routing table address of the identification and the address in the routing table coupled to the receiving ring lines.

Thus the identification and the address which represent a memory address (routing table address) are taken from the control cell. At this memory address is stated what happens to an incoming user cell that belongs to a multicast connection. For example, the user cell is conveyed to the station and is copied for the next station which forms part of the multicast connection. To this end it is then necessary to change the address in the header field.

In a multicast connection it is necessary that a user cell is copied in a network interface of each receiver station between the transmitter station and the last receiver station.

In the network interface assigned to the last receiver station in the chain of receiver stations, the incoming user cell is only conveyed to the receiver station and not copied. The control arrangement assigned to the last receiver station in the multicast connection is thus provided for storing in the routing table coupled to the receiving ring line the operating mode in which the user cell to be received is intended to be conveyed to the receiver station. The control arrangement assigned to another receiver station in the multicast connection is provided for storing in the routing table coupled to the receiving ring line the operating mode in which the user cell to be received is intended to be conveyed to the receiver station, to be doubled and the address in the doubled user cell is intended to be changed.

If there is a connection tear-down, control cells are also transmitted between the individual control arrangements. In that case, after a request for a connection tear-down coming from a user of the assigned station has been received, the network interface control arrangement which forms part of a unicast connection is provided for sending a control cell which carries a message about the connection tear-down to the other control arrangement that forms part of the unicast connection of the other network interface and for receiving a control cell which carries an acknowledgement of the connection tear-down from the other control arrangement.

In a multicast connection the control arrangement assigned to a transmitter station and forming part of this multicast connection is provided for sending a control cell which contains a message about the connection tear-down to the control arrangements assigned to the receiver stations after a request for a connection tear-down coming from a user of the transmitter station has been received, and is provided for receiving control cells which contain an acknowledgement of the connection tear-down from the control arrangement assigned to the receiver stations.

When a multicast connection is broken off, it is necessary that the operations carried out for setting up the multicast connection be cancelled. There is thus provided that after a connection tear-down of a multicast connection the control arrangements assigned to the receiver stations and taking part in the multicast connection change the operating mode stored at an identification address and the address in the assigned routing table coupled to the associated receiving ring line.

If during the set-up of a multicast connection the request for a connection is rejected by a receiver station, the connection set-up may either be rejected by the control arrangement assigned to the transmitter station or the connection set-up may be carried through without this receiver station. In that case the control arrangement assigned to the transmitter station is to send once again control cells with different identifications to the control arrangements assigned to the receiver stations which are located before the receiver station that has rejected the connection. The same procedure is carried out when a message about a connection tear-down of a receiver station is sent to the transmitter station.

Thus in a multicast connection the control arrangement assigned to a transmitter station, after a control cell containing a rejection of a connection or a tear-down message from a receiver station has been received and if a connection can nevertheless be carried through, is provided for generating control cells with corrected identifications for the receiver stations which stations lie before the receiver station that has rejected the connection or broken off same.

For a user cell or control cell to reach its destination it is necessary that the header field in a cell contain an indication about the address, an identification for a connection, the type of connection and the type of cell.

Certain bits in the header field of a cell are reserved according to normalization recommendations and rules for the VCI (virtual channel identifier) and for the VPI (virtual path identifier). The VCI indicates a virtual channel and the VPI a virtual path. In the header field of the cell the bits reserved for the VCI (virtual channel identifier) contain the information about the identification for a connection, the type of connection and the type of cell and the bits reserved for the VPI (virtual path identifier) contain the information about the address.

The invention likewise relates to a network interface for a local network operating in the asynchronous transfer mode (ATM), to which a station and sending and receiving ring lines are coupled. The network interface comprises a coupling device (switch) and a control arrangement and is used for conveying user cells containing user-related information and at least control cells containing signalling information. If the control arrangement is assigned to a transmitter station, the control arrangement is provided for generating at least a control cell to be transmitted to a receiver station once a control cell produced by the transmitter station and containing a realisable request for a unicast or multicast connection between a user of the transmitter station and a user of at least one receiver station has been received, which control cell contains in its information field at least information about the users, the address of the transmitter station and a user-related identification for a down-channel. If the control arrangement is assigned to a receiver station, the arrangement is provided for generating a control cell to be sent to the transmitter station after a control cell originating from the transmitter station and containing a realisable request for a connection from a user of the receiver station has been received, which control cell contains in its information field at least a message about the address of the assigned receiver station and a user-related identification for the up-channel.

The invention likewise relates to a station comprising an integrated network interface. For example, the network interface could be coupled as a separate card to the bus system of a personal computer.

BRIEF DESCRIPTION OF THE DRAWINGS

Embodiments of the invention will be further explained hereinbelow with reference to the drawing Figures, in which.

DETAILED DESCRIPTION OF THE PREFERRED EMBODIMENTS

Figure 1:
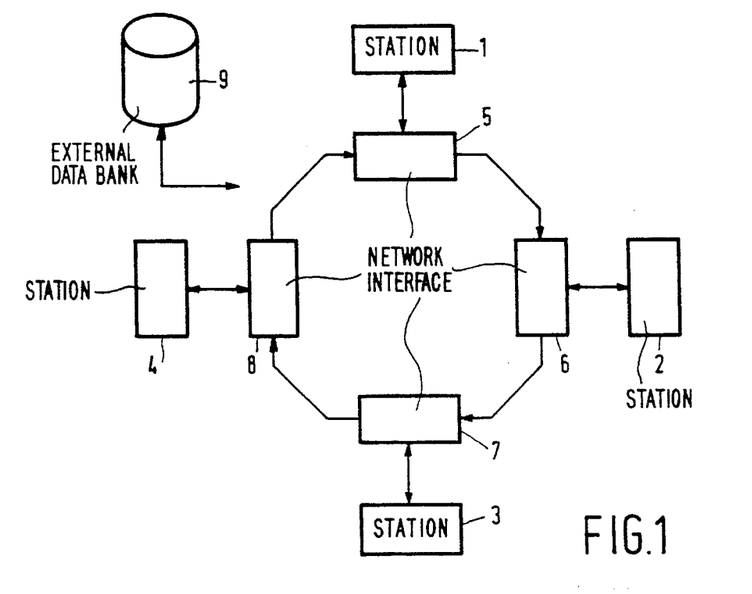
FIG. 1 shows a local network.

FIG. 1 shows an embodiment for a local network comprising 4 stations 1 to 4 which are coupled each via assigned network interfaces 5 to 8 to ring lines. A station 1 to 4 may be, for example, a videophone, a personal computer or a workstation, for example, a telephone. The messages or information originating from the stations 1 to 4, or interfaces 5 to 8, are transmitted in the asynchronous transfer mode by way of cells. A cell comprises a header field of, for example, 5 bytes and an information field of, for example, 48 bytes. The information contained in the header field of the cell is specifically used for addressing and for carrying out switch functions. Each network interface 5 to 8 is further coupled to an external data bank 9 which may provide information via the resources of the individual stations 1 to 4, or via the network topology.

Figure 2:
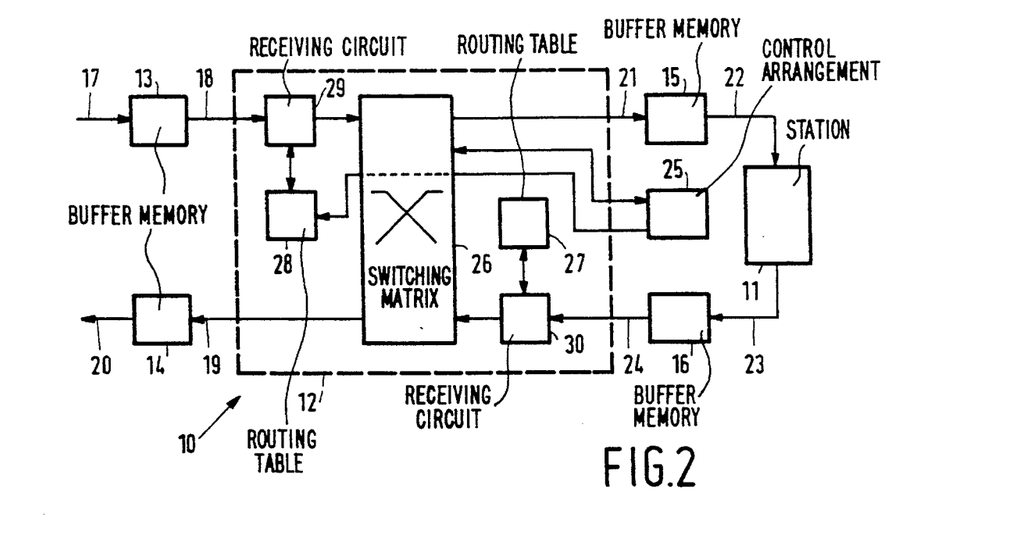
FIG. 2 shows a network interface that can be used in the local network shown in FIG. 1, with an assigned station

A network interface 10 and an assigned station 11 are represented in detail in FIG. 2. The network interface 10 comprises a coupling device 12 which is coupled to ring lines and station 11 via buffer memories 13 to 16 and switches the cell stream.

The buffer memory 13 is connected on the one hand to a receiving line 17 and on the other to a line 18 which leads to the coupling device 12. The buffer memory 13 further receives a receiving clock signal which is derived from the cell stream of the receiving ring line 17 and receives an internal clock signal from a clock generator of the network interface 10. The buffer memory 14 is coupled to the coupling device 12 via a line 19 and feeds a cell stream to a sending ring line 20. The buffer memory 14 is supplied with the internal clock signal and a send clock signal which is derived, for example, from the internal clock signal.

Buffer memory 15 which receives a cell stream from the coupling device 12 is coupled on the one hand to the coupling device 12 via a line 21 and on the other to the station 11 via a line 22. The buffer memory 15 is also supplied with the internal clock signal and a first station signal delivered by station 11. Buffer memory 16 which is supplied with the cell stream from station 11 is coupled to the station 11 via a line 23 and to the coupling device 12 via a line 24. This buffer memory 16 receives a second station clock signal and the internal clock signal. In the buffer memories 13 to 16 the cell stream is tuned to the clock signal. Deriving the various clock signals from the cell stream and generating the internal clock signal in the clock generator is not further represented here. The station clock signals may, for example, be equal to the internal clock signal. In that case buffer memories 15 and 16 are not necessary. The clock signal on a ring line of the local network having the lowest frequency determines the transmission capacity of the local network.

The network interface 10 further comprises a control arrangement 25 controlling the coupling device 12 which arrangement is used, for example, for a connection set-up or tear-down. The control arrangement 25, which may be realised as a microprocessor, may receive and generate cells similarly to station 11.

The coupling device 12 further includes a switching matrix 26, two routing tables 27 and 28 and two receiving circuits 29 and 30. The header field of a cell arriving via line 18 is evaluated in the receiving circuit 29. An identification and an address contained in the header field are used as a memory address for the routing table 28 connected to the receiving circuit 29. The information stored at the memory address is used by the receiving circuit 29 for organizing the further processing and routing of the cell. For example, the receiving circuit 29 can copy the cell and give it a new address. The original cell is delivered to station 11 via switching matrix 26 and the copied cell to buffer memory 14 via switching matrix 26. There is another possibility that the switching matrix 26 performs this copy function.

The receiving circuit 30 is coupled to the buffer memory 16 via line 24 and conveys received cells to the coupling matrix 26. The routing table 27 which contains information about the processing and routing of cells in its memory cells, as does routing table 28, is connected to the receiving circuit 30.

Two types of payload cells are transmitted via the ring lines 17 and 20. On the one hand, user cells whose information field contains, for example, messages or data of the user of the connection set up previously and, on the other, control cells whose information field contains control information. A user cell arriving at the receiving ring line 17 (ring input) may be conveyed on the one hand to station 11 or on the other to sending ring line 20 (ring output) by the coupling device 12. A user cell may also be erased in coupling device 12. Coupling device 12 may also switch a user cell to station 11 and simultaneously to the sending ring line 20. A user cell generated by station 11 is conveyed only to the sending ring line 20 by coupling device 12.

Control cells delivered by receiving line 17 may be transferred to the station and/or sending ring line 20. Furthermore, a control cell may be switched through to control arrangement 25. Control cells generated by control arrangement 25 may reach station 11 and/or sending ring line 20. The control cells delivered by station 11 may also be led back to station 11 in a self-test.

If a cell is received in coupling device 12 the receiving circuits 29 and 30 first evaluate its header field. If the address contained in the header field is not the same as the address of station 11, the cell is transferred to the sending ring line 20. If the address in the header field of the cell corresponds to the address of station 11, the cell is conveyed to that station 11 and/or to the control arrangement 25. It is likewise conceivable that the control cell is also transferred to the sending ring line 20.

Certain bits in the header field of a cell are reserved for the VCI (virtual channel identifier). This message contains according to normalization recommendations the destination of a cell and thus indicates a virtual link. Furthermore, certain bits in the header field of the cell are reserved for the VPI (virtual path identifier). The VPI contains information about the address and destination. The VCI may comprise an indication about the user-related identification for a connection, the type of connection and the type of cell.

According to current normalization recommendations the header field of the cell contains 8 bits for the VPI and 16 bits for the VCI. A bit of the VCI may be used for indicating whether a control cell or a user cell is concerned. At least two further bits may denote the type of connection. It may be a unicast connection, a multicast connection or a broadcast connection. In a unicast connection or point-to-point connection there is a virtual connection between a user of a first station and a user of a second station. In a multicast connection or point-to-multipoint connection various users of stations are connected to each other. In a broadcast connection a transmitter station sends to all the stations lying between the transmitter station and the last receiver station cells having the same information field contents. The remaining 12 bits of the VCI may be used for a user-related identification for a connection. The user-related identification and the address denote a virtual connection (either up or down-channel) from which a coupling device takes the information that a cell having this identification and this address is a user, for example, of its station.

By means of control sequences there will be explained in the following how the control arrangement 25 of a network interface 10 functions. First there will be an explanation of the set up of a unicast connection from a station EX to a station EY.

Figure 3:
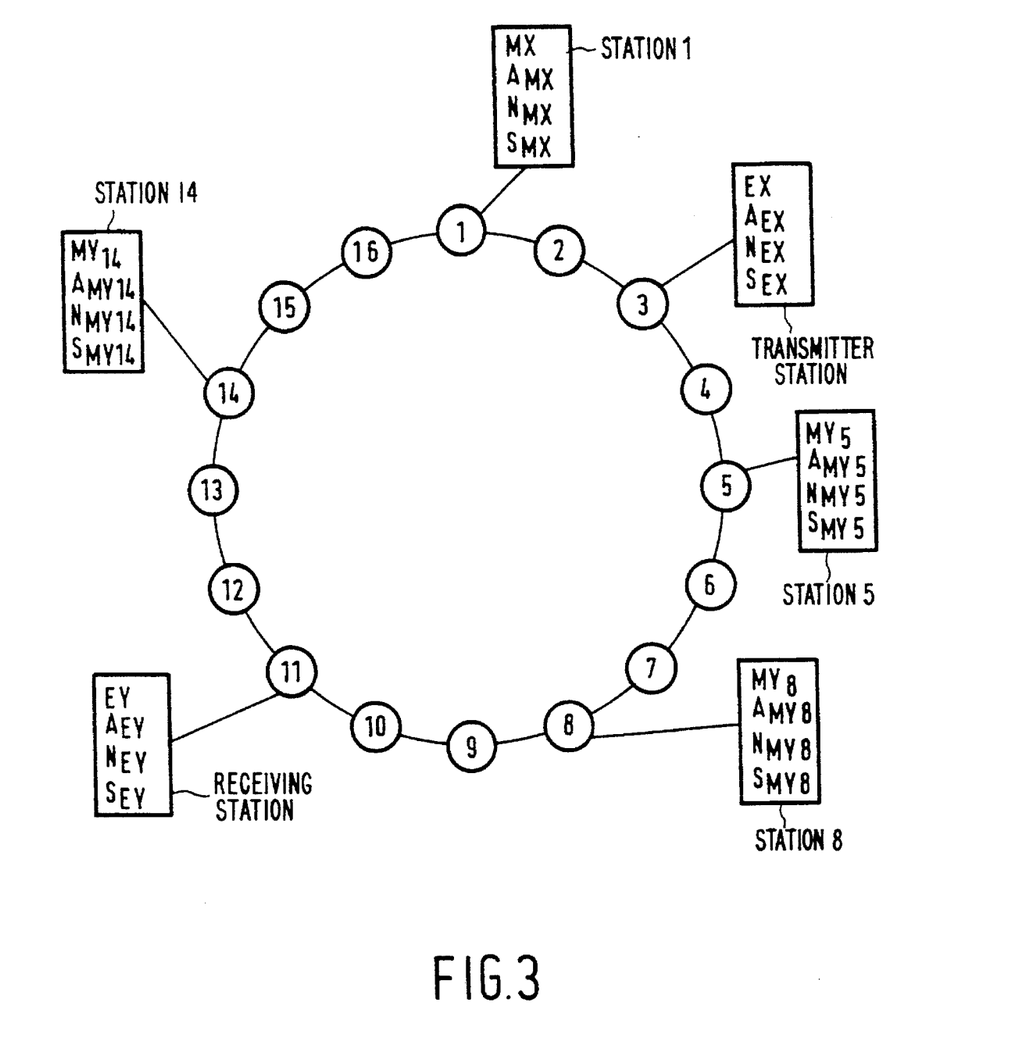
FIG. 3 shows a diagrammatic outline of a local network to explain the connection set-up or connection tear-down.

FIG. 3 gives an outline of a local network having a total of 16 stations. For example, station 3 may be a transmitter station EX, whose user $A_{EX}$ would like to set up a unicast connection with the user $A_{EY}$ of station 11 which station represents a receiver station EY. To transmitter station EX are assigned a network interface $N_{EX}$ and a control arrangement $S_{EX}$ and to the receiver station EY are assigned a network interface $N_{EY}$ and a control arrangement $S_{EY}$. The control arrangement $S_{EX}$ has the following control sequence for a unicast connection:

Has a control cell containing a connection request from a user $A_{EX}$ of station EX arrived?
Yes: Is desired connection permitted?
  No: Connection request is rejected;
  Yes: Is a free identification $VCI_{EX}$ available for the down-channel from network interface $N_{EY}$ to network interface $N_{EX}$?
    No: Connection request is rejected;
    Yes: A control cell carrying the following information in its information field: "Connection request from user $A_{EX}$ (in $VPI_{EX}$ and $VCI_{EX}$) to user $A_{EY}$", is sent to control arrangement $S_{EY}$ of network interface $N_{EY}$;
    Has a response been received from control arrangement $S_{EY}$ of network interface $N_{EY}$ within a given period of waiting time (time out)?

No: Connection request is rejected;
Yes: The control cell received from control arrangement $S_{EY}$ is evaluated;
Can connection be set up?
No: Connection request is rejected;
Yes: User $A_{EX}$ of station EX is informed of the successful connection set-up by means of a control cell (in $VPI_{EY}$ and $VCI_{EY}$).

First a test is made whether a control cell has arrived which contains a connection request from a user $A_{EX}$ of station EX. If this is the case, an external databank (cf. databank 9 in FIG. 1), or an internal memory of the network interface $N_{EX}$ is inquired whether such a connection is permitted. For example, with this inquiry there is a check whether the station EY to be included in the connection has the necessary resources. If such a connection is not permitted, the connection request is rejected.

User $A_{EX}$ of station EX (station 3) would like to have connection with user $A_{EY}$ of station EY (station 11). First control arrangement $S_{EX}$ checks whether the down-channel from network interface $N_{EY}$ to network interface $N_{EX}$ has a free identification available. For example, there may already be so many virtual connections that a further connection to station EY is impossible. If this is the case, the connection request is rejected. To station EX is then sent a control cell containing a rejection of the request for the connection. If there is a free identification available for the down-channel, the control cell is sent to the control arrangement $S_{EY}$ of network interface $N_{EY}$ which cell informs control arrangement $S_{EY}$ that the user $A_{EX}$ has a request for the connection to user $A_{EY}$ and that user $A_{EX}$ is assigned the address $VPI_{EX}$ and identification $VCI_{EX}$.

If in a given waiting period (time out) an answer has not been received from control arrangement $S_{EY}$, station EX is informed via a control cell that the connection request has been rejected. If control arrangement $S_{EX}$ has received a control cell from control arrangement $S_{EY}$, this cell is evaluated and checked whether control arrangement $S_{EY}$ has informed control arrangement $S_{EX}$ that the connection can be set up. If this is not the case, the request for the connection is rejected and an appropriate message is sent to station EX. Otherwise, a message about the successful connection set up is sent to user $A_{EX}$.

The measures for a set up of a unicast connection of control arrangement $S_{EY}$ of network interface $N_{EY}$ can be shown in the following control sequence:
Has a control cell from network interface $N_{EX}$ arrived?
Yes: Is a free identification $VCI_{EY}$ available for the connection from network interface $N_{EX}$ to network interface $N_{EY}$?
No: A control cell carrying the information that a connection cannot be set up is sent to control arrangement $S_{EX}$ of network interface $N_{EX}$;
Yes: Can user $A_{EY}$ of station EY accept the connection?
No: A control cell containing the information that a connection cannot be set up is sent to control arrangement $E_{EX}$;
Yes: A control cell carrying in its information field the information about $VCI_{EX}$, $VPI_{EX}$, $VCI_{EY}$ and $VPI_{EY}$ is sent to user $A_{EY}$ of station EY;
A control cell carrying the following information in its information field:
"Connection to user $A_{EY}$ of station EY set up with $VPI_{EY}$ and $VCI_{EY}$", is conveyed to control arrangement $S_{EX}$;
If a control cell from network interface $N_{EX}$ has arrived at control arrangement $S_{EY}$, a check is made whether for this connection a free identification $VCI_{EY}$ (for the up-channel) is available. If this is not the case, control arrangement $S_{EX}$ is informed by way of the control cell that a connection cannot be set up. If such a connection can set up, user $A_{EY}$ of station EY is asked whether he/she accepts the connection. If a connection cannot be accepted, a control cell carrying the information that the connection is impossible is sent to control arrangement $S_{EX}$. In the other case, a control cell containing information about the address $VPI_{EX}$ of user $A_{EX}$, the identification $VCI_{EX}$ for the down-channel, the address $VPI_{EY}$ and the identification $VCI_{EY}$ of the up-channel is sent to user $A_{EY}$ of station EY. A control cell containing the information that the connection to user $A_{EY}$ having the address $VPI_{EY}$ and the identification $VCI_{EY}$ has been set up is also sent to the control arrangement $S_{EX}$.

In the case of a unicast connection tear-down, control arrangement $S_{EX}$ assigned to station X and control arrangement $S_{EY}$ assigned to station Y perform each the following control sequence:
Has a request for the connection tear-down from user $A_{EX}$ of station EX arrived via a control cell?
Yes: Tear-down of connection to user $A_{EX}$;
A control cell carrying the following information in its information field: "Tear-down of connection between user $A_{EX}$ with $VPI_{EX}$ and $VCI_{EX}$", is applied to control arrangement $S_{EY}$ of network interface $N_{EY}$;
Has a control cell carrying an acknowledgement of the tear-down of the connection been received from control arrangement $S_{EY}$?
Yes: User $A_{EX}$ of station EX is informed of the connection tear-down by means of the control cell; the $VCI_{EX}$ reserved for user $A_{EX}$ is released;
Has a control cell carrying a request for the connection tear-down of the down-channel from network interface $N_{EY}$ to network interface $N_{EX}$ a arrived from control arrangement $S_{EX}$?
Yes: Tear-down of down-channel;
The user $A_{EY}$ of station EY is informed of the tear-down by means of a control cell; The $VCI_{EY}$ reserved for user $A_{EY}$ is released;
A control cell carrying the following information is sent to control arrangement $S_{EX}$:
"Acknowledgement of connection tear-down between user $A_{EY}$ with $VPI_{EY}$ and $VCI_{EY}$ and user $A_{EX}$".

If a control cell containing a request for the connection tear-down of the connection of user $A_{EX}$ has arrived, first the connection to user $A_{EX}$ is terminated. Then a control cell expressing that user $A_{EX}$, who has the address $VPI_{EX}$ and the identification $VCI_{EX}$, would like to terminate the connection is applied to control arrangement $S_{EY}$ by control arrangement $S_{EX}$. If a control cell carrying an acknowledgement with respect to the connection tear-down has been received from control arrangement $S_{EY}$, user $A_{EX}$ is informed of the termination by means of a control cell and the identification $VCI_{EX}$ reserved for user $A_{EX}$ is released.

If control arrangement $S_{EY}$ receives a control cell containing a request for a connection tear-down of the down-channel from network interface $N_{EY}$ to network interface $N_{EX}$ from control arrangement $S_{EX}$, the down-channel is terminated. The user $A_{EY}$ is informed of the termination and the identification $VCI_{EY}$ reserved for user $A_{EY}$ is released. Finally, a control cell containing an acknowledgement of the tear-down of the connection between user $A_{EY}$ and user $A_{EX}$, is sent to control arrangement $S_{EX}$.

The control sequences represented here for the connection tear-down of control arrangements $S_{EX}$ and $S_{EY}$ are used by the other control arrangement if user $A_{EY}$ breaks off the connection first.

Next, the control sequences of the control arrangements in a multicast connection will be presented. Herein it is possible to effect a connection between station 1 (cf. FIG. 3) and stations 5, 8 and 14. Station 1 is the transmitter station MX with a user $A_{MX}$, an assigned network interface $N_{MX}$ and an assigned control arrangement $S_{MX}$. The user requests for a connection set-up with the users $A_{MY5}$ of station $MY_5$, the user $A_{MY8}$ of station $MY_8$ and the user $A_{MY14}$ of station $MY_{14}$. The control sequence of control arrangement $S_{MX}$, which arrangement is assigned to transmitter station MX (station 1), will be discussed hereinbelow:

Has a request for the connection between a user $A_{MX}$ of station MX and a plurality of selected users $A_{MYi}$ of stations $Y_{Mi}$, i=1, . . . , N arrived via a control cell?
Yes: Is requested connection permitted?
No: Request for a connection is rejected;
Yes: The order of the receiver stations in the direction of the ring is determined by inquiring a databank; Is there a free identification $VCI_{MX}$ available for the down-channel from the network interfaces $N_{MYi}$, i=1, . . . , N to the network interface $N_{MX}$?
No: Request for connection is rejected;
Yes: Is there a free identification $VCI_{MY}$ available for the selected connections from the network interface $N_{MX}$ to the network interfaces $N_{MYi}$, i=1, . . . , N?
No: Request for connection is rejected;
Yes: Except for the last control arrangement $S_{MYN}$, the control arrangements $S_{MYi}$, i=1, . . . , N−1 selected for the multicast connection are successively supplied with the control cell which carries in its information field the following information: "Request for a multicast connection between user $A_{MX}$ (in $VPI_{MX}$ and $VCI_{MX}$) and users $A_{MYi}$ (in $VPI_{MYi}$ and $VCI_{MY}$); Entry in Table at ring input of the network interface:
Memory address ($VPI_{MYi}$, $VCI_{MY}$)→$VPI_{MYi+1}$, copy".
A control cell carrying the following information in its information field is sent to the last control arrangement $S_{MYN}$:
"Request for multicast connection from user $A_{MX}$ (in $VPI_{MX}$ and $VCI_{MX}$) to users $A_{MYN}$ (in $VPI_{MYN}$ and $VCI_{MYN}$); Entry in Table at ring input of network interface:
Memory address ($VPI_{MYN}$, $VCI_{MY}$)→no VPI change, reception". Have positive answers in the control cells been received from control arrangement $S_{MYi}$ of network interface $N_{MYi}$ within a given period of waiting time (time out)?
No: Can the multicast connection be set up nevertheless?
No: Request for connection is rejected;
Yes: The receiver stations located before the eliminated receiver station are to be informed of the new data according to above procedure;
Yes: User $A_{MX}$ is informed of the successful connection set-up and $VPI_{Mx}$, $VCI_{MX}$ and $VPI_{MYi}$ and $VCI_{MY}$ by means of a control cell.

If a control cell has conveyed a request for a connection from a user $A_{MX}$ of transmitter station MX to a plurality of selected users $A_{MYi}$ of receiver stations MYi to control arrangement $S_{MX}$, an inquiry, for example, to an external databank, checks whether this connection is permitted. If such a connection is impossible, the connection request is rejected. In the other case the order of the receiver stations in the direction of the ring is determined via an inquiry of an external databank (for example, of the network management) or of an internal memory in the network interface $N_{MX}$. Subsequently, a check is made whether for the down-channel from the network interfaces $N_{MYi}$ to network interface $N_{MX}$ a free user-related identification $VCI_{MX}$ is available. If this is not the case, the request for the connection is turned down and the user $A_{MX}$ is informed thereof by means of a control cell.

If a free identification is available, there is then checked whether a free identification $VCI_{MY}$ is available. These user-related identifications for the up-channel to the individual receiver stations are formed by a running number and a number related to the transmitter station. Contrary to the unicast connection, the identification for the up-channel in a multicast connection is given by the control arrangement $S_{MX}$ of the transmitter station. If such a free identification is not found, the user $A_{MX}$ is informed that a connection set-up is impossible. If such a free identification $VCI_{MY}$ is found, the control arrangement $S_{MX}$ sends a control cell to each consecutive control arrangement $S_{MYi}$ assigned to a receiver station $MY_i$.

The control cell sent to the last receiver station $MY_N$ of the multicast connection (thus to station 14) carries the information that the user $A_{MX}$ having the address $VPI_{MX}$ and the identification $VCI_{MX}$ for the down-channel with the user $A_{MYN}$ having the address $VPI_{MYN}$ and the identification $VCI_{MY}$ for the up-channel asks for a multicast connection. Furthermore, an entry should be made in the routing table at the ring input of the network interface at the memory address of the $VPI_{MYN}$ and $VCI_{MY}$ that no change of the VPI is to be effected for the next station and that there is a receive command available of a user cell for the station $VPI_{MYN}$. For the control arrangements of the other network interfaces, thus for the network interfaces of the stations 5 and 8 the information field of the control cell denotes that a request for a multicast connection between user $A_{MX}$ and users $A_{MYi}$ is available and that a command to copy a user cell is to be entered in the routing table at the ring input of the network interface at the memory address of $V_{MYi}$ and $VCI_{MY}$ as well as a change of the address for the copied user cell. The next receiver station taking part in the multicast connection is entered as the new address.

The control arrangement $S_{MX}$ waits for a given period of time whether positive responses are received from the control arrangements $S_{MYi}$. If this is not the case, a test is made whether the multicast connection can nevertheless be established. If this is impossible, the request for a connection from the user $A_{MX}$ is rejected. If a connection is possible despite a rejection of the request for a connection from a receiver station, the receiver stations lying before the eliminated receiver station are supplied with control cells containing new information according to above procedure. If positive responses are received from the control arrangements $S_{MYi}$, the user $A_{MX}$ is informed of the successful connection set-up and the associated addresses and identifications ($VPI_{MX}$, $VCI_{MX}$, $VPI_{MY1}$ and $VCI_{MY}$).

In the following the control sequence for a control arrangement $S_{MYi}$, which is assigned to a receiver station $MY_i$ taking part in a multicast connection, is shown:
Has a control cell arrived from network interface $N_{MX}$?
Yes: Is it possible for user $A_{MYi}$ to take part in the multicast connection?
No: A control cell containing information that a connection cannot be established is sent to the control arrangement $S_{MX}$ of the network interface $N_{MX}$;
Yes: A control cell carrying in its information field the information about $VCI_{MX}$, $VPI_{MX}$, $VCI_{MY}$ and $VPI_{MYi}$ is sent to user $A_{MYi}$ of station $MY_i$;
The table at the ring input is changed in accordance with the received information;

A control cell is supplied to the control arrangement $S_{MX}$ which cell has the following information in its information field:

"Connection to user $A_{MYi}$ of station $MY_i$ set up".

If a control cell from network interface $N_{MX}$ has arrived, first a check is made whether it is possible for user $A_{MYi}$ to take part in the multicast connection. If he cannot take part, a control cell is sent from control arrangement $S_{MYi}$ to control arrangement $S_{MX}$ which cell carries the information that a connection cannot be set up. Otherwise, a control cell carrying in its information field the information about the user-related identifications $VCI_{MX}$ and $VCI_{MY}$ and the addresses $VPI_{MX}$ and $VPI_{MYi}$ is sent to the user $A_{MYi}$ of station $MY_i$. The routing table at the ring input is changed in accordance with the received information. Finally, a control cell is delivered to the control arrangement $S_{MX}$, which cell indicates that the connection to user $A_{MYi}$ of station $MY_i$ has been set up.

If the multicast connection is to be terminated, which connection is requested by the user $A_{MX}$ of transmitter station MX, control arrangement $S_{MX}$ carries out the following control sequence:

Has a request for the multicast connection from user $A_{MX}$ of station MX arrived?

Yes: Connection to user $A_{MX}$ broken off;

Each control arrangement $S_{MYi}$ is supplied with the control cell containing the following information in its information field:

"Connection tear-down of user $A_{MX}$ in $VPI_{MX}$ and $VCI_{MX}$; entry in table at ring input of network interface $N_{MYi}$: Address: ($VPI_{MYi}$, $VCI_{MY}$)→no VPI change, transfer of cell to ring output".

Have control cells carrying an acknowledgement of the connection tear-down been received from each of the control arrangements $S_{MYi}$ taking part in the multicast connection?

Yes: User $A_{MX}$ of station MX is informed of the tear-down of the connection by means of a control cell;

The codes $VCI_{MX}$ and $VCI_{MY}$ reserved for user $A_{MX}$ are released.

If a request for the multicast connection tear-down has arrived from the user $A_{MX}$ by means of the control cell, first the connection to the user $A_{MX}$ is terminated and then a control cell is subsequently sent to each control arrangement $S_{MYi}$, which cell indicates that the connection of user $A_{MX}$ to which is assigned the code $VCI_{MX}$ and the address $VPI_{MX}$, is broken off. The table at the ring input of the network interface $N_{MYi}$ is also to be changed. At the memory address featured by the code $VCI_{MY}$ and $VPI_{MYi}$ is entered that no VPI change is to be effected and that an arriving user cell is to be transferred directly to the ring output.

If the control cells have been received from each control arrangement $S_{MYi}$ taking part in a multicast connection and which cell contains an acknowledgement of the connection tear-down, the user $A_{MX}$ is informed of the tear-down of the connections by means of a control cell. Subsequently, the codes $VCI_{MX}$ and $VCI_{MY}$ are released.

A control sequence for the termination of a connection in the control arrangement $S_{MYi}$ which arrangement is assigned to a receiver station, is as follows:

Has a control cell containing a request for a tear-down of the down-channel been received from control arrangement $S_{MX}$?

Yes: Tear-down of the down-channel;

The user $A_{MYi}$ of station $MY_i$ is informed of the tear-down by means of a control cell;

The table at the ring input is changed in accordance with the received information;

A control cell containing the following information is sent to the control arrangement $S_{MX}$:

"Acknowledgement in $VPI_{MYi}$ and $VCI_{MY}$ of the tear-down of the connection between user $A_{MYi}$ and user $A_{MX}$".

If a control cell carrying a request for a tear-down of the down-channel has arrived from control arrangement $S_{MX}$, the down-channel is broken off and the user $A_{MYi}$ of station $MY_i$ is informed of this tear-down by means of a control cell. The table at the input is changed in accordance with the received information. A control cell carrying the acknowledgement of the termination of the connection is subsequently sent to the control arrangement $S_{MX}$.

If the request for a connection tear-down is sent from a receiver station taking part in the multicast connection, the control arrangement $S_{MX}$ first checks whether the multicast connection can nevertheless be maintained. If this is not the case, the multicast connection is terminated in accordance with above procedure. In the other case the connection is re-established to the receiver stations positioned before the receiver station that terminates the connection.

What is claimed is:

1. A local network operating in the asynchronous transfer mode (ATM), comprising;

a plurality of stations, said stations including means for transmitting user cells containing user-oriented information and control cells containing signalling information; and a plurality of network interfaces, each including a coupling device and a control arrangement, said plurality of network interfaces for coupling said plurality of stations to sending and receiving lines, wherein a control arrangement assigned to a transmitter station includes means for generating a control cell to be transmitted to a receiver station after a control cell containing a realisable request for a single (unicast) or a multiple (multicast) connection between a user of the transmitter station and a user of at least one receiver station has been received from the transmitter station, wherein the generated control cell contains in its information field information about the user, an address of the transmitter station and a user-related identification for a down-channel, and wherein a control arrangement assigned to a receiver station includes means for generating a control cell to be sent to the transmitter station after a control cell originating from the transmitter station and containing a realisable request for a connection from a user of the receiver station has been received, wherein the generated control cell contains in its information field a message about an address of the assigned receiver station and a user-related identification for an up-channel.

2. The local network as claimed in claim 1, wherein the control arrangement assigned to a receiver station further includes means for determining the user-related information for the up-channel from the transmitter station to the receiver station and means for generating a control cell to be sent to the transmitter station and containing the user-related identification after a control cell containing a request for a connection between a user of the transmitter station and the receiver station has been received in the case of a realisable unicast connection.

3. The local network as claimed in claim 2, wherein the control arrangement assigned to a transmitter station or a receiver station, in an instance in which a connection cannot be realised, further includes means for producing a control cell carrying a message about a rejection of the connection request for the transmitter station or receiver station, respectively.

4. The local network as claimed in claim 3, wherein the control arrangement assigned to a transmitter station and forming part of a multicast connection further includes means for sending a control cell which contains a message about a connection tear-down to the control arrangements assigned to the receiver stations of the multicast connection after a request for a connection tear-down coming from a user of the transmitter station has been received, and means for receiving control cells which contain an acknowledgement of the connection tear-down from the control arrangements assigned to the receiver stations, wherein further, after the connection tear-down of a multicast connection, the control arrangements assigned to the receiver stations taking part in the multicast connection further include means for changing the operating mode stored at an identification address and the address in the assigned routing table coupled to the associated receiving ring line and wherein in a multicast connection the control arrangement assigned to a transmitter station, after a control cell containing a rejection of a connection or a tear-down message from a receiver station has been received and if a connection can nevertheless be carried through, still further includes means for generating control cells with corrected identifications for the receiver stations which stations lie before the receiver station that has rejected the connection or broken off the same.

5. The local network as claimed in claim 2, wherein after a request for a connection tear-down coming from a user of a corresponding assigned station has been received, the control arrangement of a network interface therefor, which control arrangement forms part of the unicast connection, further includes means for sending a control cell which carries a message about the connection tear-down to the other control arrangement that forms part of the unicast connection of the other network interface and means for receiving a control cell which carries an acknowledgement of the connection tear-down from the other control arrangement.

6. The local network as claimed in claim 3, wherein the coupling device of each network interface comprises receiving circuits, routing tables and a switching matrix, wherein each receiving circuit includes means for taking an identification and an address from a header field of an arriving cell and means for taking control information about processing and further routing of the arrived cell based upon the identification and address from a corresponding routing table, further wherein, after a control cell for a multicast connection has arrived, the control arrangement assigned to a receiver station, other than a last receiver station of a multicast connection, further includes means for taking an operating mode for a further routing of user cells, the identification and the address from the information field of the control cell, and means for storing in a routing table coupled to the receiving ring line the operating mode at the routing table address of the identification and the address, and further wherein the control arrangement assigned to the last receiver station in the multicast connection further includes means for storing in a routing table coupled to the receiving ring line an operating mode in which the user cell to be received is intended to be conveyed to the receiver station, and still further wherein the control arrangement assigned to a receiver station other than the last receiver station in the multicast connection includes means for storing in the routing table coupled to the receiving ring line an operating mode in which the user cell to be received is intended to be conveyed to the receiver station, to be doubled and the address in the doubled user cell is intended to be changed.

7. The local network as claimed in claim 1, wherein the control arrangement assigned to a transmitter station further includes means for determining user-related identifications for the up and down-channels from the transmitter station to receiver stations after a control cell carrying a request for a connection between a user of the transmitter station and at least one user of a plurality of receiver stations, in the case of a realisable multicast connection, has been received, and means for generating control cells to be transmitted to the receiver stations which control cells contain the user-related identifications, and wherein the control arrangement assigned to a receiver station further includes means for storing a user-related identification and means for generating a transmitter station-destined control cell which carries an acknowledgement of a connection after a control cell carrying a request for a connection between a user of the transmitter station and the instant receiver station and further receiver stations, in the case of a realisable connection to the instant receiver station, has been received, and in an instance in which a multicast connection is set up, the control arrangement assigned to the transmitter station still further includes means for generating, in a consecutive manner, control cells for each receiver station.

8. The local network as claimed in claim 7, wherein the control arrangement assigned to a transmitter station and forming part of a multicast connection further includes means for sending a control cell which contains a message about a connection tear-down to the control arrangements assigned to the receiver stations of the multicast connection after a request for a connection tear-down coming from a user of the transmitter station has been received, and means for receiving control cells which contain an acknowledgement of the connection tear-down from the control arrangements assigned to the receiver stations, wherein further, after the connection tear-down of a multicast connection, the control arrangements assigned to the receiver stations taking part in the multicast connection further include means for changing the operating mode stored at an identification address and the address in the assigned routing table coupled to the associated receiving ring line and wherein in a multicast connection the control arrangement assigned to a transmitter station, after a control cell containing a rejection of a connection or a tear-down message from a receiver station has been received and if a connection can nevertheless be carried through, still further includes means for generating control cells with corrected identifications for the receiver stations which stations lie before the receiver station that has rejected the connection or broken off the same.

9. The local network as claimed in claim 7, wherein the control arrangement assigned to a transmitter station or a receiver station, in an instance in which a connection cannot be realised, further includes means for producing a control cell carrying a message about a rejection of the connection request for the transmitter station or receiver station, respectively.

10. The local network as claimed in claim 7, wherein the coupling device of each network interface comprises receiving circuits, routing tables and a switching matrix, wherein each receiving circuit includes means for taking an identification and an address from a header field of an arriving cell and means for taking control information about processing and further routing of the arrived cell based upon the identification and address from a corresponding routing table, further wherein, after a control cell for a multicast connection has arrived, the control arrangement assigned to a receiver station, other than a last receiver station of a multicast connection, further includes means for taking an operating mode for a further routing of user cells, the identification and the address from the information field of the control cell, and means for storing in a routing table coupled to the receiving ring line the operating mode at the routing table address of the identification and the address, and further wherein the control arrangement assigned to the last receiver station in the multicast connection further includes means for storing in a routing table coupled to the receiving ring line an operating mode in which the user cell to be received is intended to be conveyed to the receiver station, and still further wherein the control arrangement assigned to a receiver station other than the last receiver station in the multicast connection includes means for storing in the routing table coupled to the receiving ring line an operating mode in which the user cell to be received is intended to be conveyed to the receiver station, to be doubled and the address in the doubled user cell is intended to be changed.

11. The local network as claimed in claim 1, wherein the coupling device of each network interface comprises receiving circuits, routing tables and a switching matrix, wherein each receiving circuit includes means for taking an identification and an address from a header field of an arriving cell and means for taking control information about processing and further routing of the arrived cell based upon the identification and address from a corresponding routing table, further wherein, after a control cell for a multicast connection has arrived, the control arrangement assigned to a receiver station, other than a last receiver station of a multicast connection, further includes means for taking an operating mode for a further routing of user cells, the identification and the address from the information field of the control cell, and means for storing in a routing table coupled to the receiving ring line the operating mode at the routing table address of the identification and the address, and further wherein the control arrangement assigned to the last receiver station in the multicast connection further includes means for storing in a routing table coupled to the receiving ring line an operating mode in which the user cell to be received is intended to be conveyed to the receiver station, and still further wherein the control arrangement assigned to a receiver station other than the last receiver station in the multicast connection includes means for storing in the routing table coupled to the receiving ring line an operating mode in which the user cell to be received is intended to be conveyed to the receiver station, to be doubled and the address in the doubled user cell is intended to be changed.

12. The local network as claimed in claim 11, wherein the control arrangement assigned to a transmitter station and forming part of a multicast connection further includes means for sending a control cell which contains a message about a connection tear-down to the control arrangements assigned to the receiver stations of the multicast connection after a request for a connection tear-down coming from a user of the transmitter station has been received, and means for receiving control cells which contain an acknowledgement of the connection tear-down from the control arrangements assigned to the receiver stations, wherein further, after the connection tear-down of a multicast connection, the control arrangements assigned to the receiver stations taking part in the multicast connection further include means for changing the operating mode stored at an identification address and the address in the assigned routing table coupled to the associated receiving ring line and wherein in a multicast connection the control arrangement assigned to a transmitter station, after a control cell containing a rejection of a connection or a tear-down message from a receiver station has been received and if a connection can nevertheless be carried through, still further includes means for generating control cells with corrected identifications for the receiver stations which stations lie before the receiver station that has rejected the connection or broken off the same.

13. The local network as claimed in claim 1, wherein a header field of a cell contains an indication about the address, an identification for a connection, the type of connection, and the type of cell.

14. The local network as claimed in claim 13, wherein bits in the header field of the cell which are reserved for the VCI (virtual channel identifier) contain information about the identification for a connection, the type of connection, and the type of cell and wherein bits reserved for the VPI (virtual path identifier) contain information about the address.

15. A network interface for a local network operating in the asynchronous transfer mode (ATM), to which a station and sending and receiving lines are coupled, said network interface comprising:

a coupling device; and a control arrangement for conveying user cells containing user-related information and control cells containing signalling information, wherein said control arrangement, if assigned to a transmitter station, includes means for generating a control cell to be transmitted to a receiver station after a control cell produced by the transmitter station and containing a realisable request for a unicast or multicast connection between a user of the transmitter station and a user of at least one receiver station has been received, wherein the generated control cell contains in its information field information about the users, an address of the transmitter station, and a user-related identification for a down-channel, and wherein said control arrangement, if assigned to a receiver station, includes means for generating a control cell to be sent to the transmitter station after a control cell originating from the transmitter station and containing a realisable request for a connection from a user of the receiver station has been received, wherein the generated control cell contains in its information field a message about the address of the assigned receiver station and a user-related identification for an up-channel.

16. A station comprising an integrated network interface for a local network operating in the asynchronous transfer mode (ATM), to which sending and receiving ring lines are coupled, said station comprising:

a coupling device; and a control arrangement for conveying user cells containing user-related information and control cells containing signalling information, wherein said control arrangement, if assigned to a transmitter station, includes means for generating a control cell to be transmitted to a receiver station after a control cell produced by the transmitter station and containing a realisable request for a unicast or multicast connection between a user of the transmitter station and a user of at least one receiver station has been received, wherein the generated control cell contains in its information field information about the users, an address of the transmitter station, and a user-related identification for a down-channel, and wherein said control arrangement, if assigned to a receiver station, includes means for generating a control cell to be sent to the transmitter station after a control cell originating from the transmitter station and containing a realisable request for a connection from a user of the receiver station has been received, wherein the generated control cell contains in its information field a message about the address of the assigned receiver station and a user-related identification for an up-channel.

* * * * *